US006471936B1

(12) United States Patent
Chen et al.

(10) Patent No.: US 6,471,936 B1
(45) Date of Patent: Oct. 29, 2002

(54) METHOD OF REVERSIBLY STORING $H_2$ AND $H_2$ STORAGE SYSTEM BASED ON METAL-DOPER CARBON-BASED MATERIALS

(75) Inventors: Pin Chen; Jianyi Lin; Kuang Lee Tan, all of Singapore (SG)

(73) Assignee: National University of Singapore (SG)

( * ) Notice: Subject to any disclaimer, the term of this patent is extended or adjusted under 35 U.S.C. 154(b) by 0 days.

(21) Appl. No.: 09/517,057

(22) Filed: Mar. 2, 2000

(30) Foreign Application Priority Data

Jun. 4, 1999 (SG) ............................................ 9902930

(51) Int. Cl.[7] ................................................ C01B 3/02

(52) U.S. Cl. .................................... 423/658.2; 502/427

(58) Field of Search ........................... 423/648.1, 658.2

(56) References Cited

U.S. PATENT DOCUMENTS 4,716,736 A * 1/1988 Schwarz ........................ 62/48
6,280,697 B1 * 8/2001 Zhou et al. ................. 423/414

OTHER PUBLICATIONS

International Publication WO 94/07794 published Apr. 14, 1994.*

"Studies on the Preparation and the Growth Mechanism of Carbon Nanotubes", P. Chen, H. Zhang, G. Lin, Q. Hong, Y. Gao, K.R. Tsai (Chemistry Department, State Key Laboratory on Solid Surface, Xiamen University, Xiamen, 361005), "Progresses in Catalysis" 1996.

"Studies on Structure and Property of Carbon–nanotubes Formed Catalytically from Decomposition of CH4 or CO", Ping Chen, Hong–Bin Zhang, Guo–Dong Lin Khi–Rui Tsai (Institute of Physical Chemistry & State Key Lab of Physical Chemistry on the Solid Surfaces, Xiamen University, Xiamen, 361005).

"Carbon Nanotube Prepared by Catalytic Pyrolysis of Methane", Ping Chen, Pei–Feng Wang, Guo–Dong Lin, Hong–Bin Zhang, Khi–Rui Tsai (Department of Chemistry, State Key Laboratory for Physical Chemistry of the Solid Surface, Xiamen University, Xiamen, 361005).

"Comparative Studies on the Structure and Electronic Properties of Carbon Nanotubes Prepared by the Catalytic Pyrolysis of CH4 and Disproportionation of CO", P. Chen, X. Wu, J. Lin, H. Li, K.L. Tan (Physics Department, National University of Singapore, Singapore 119260, Singapore) Carbon 38 (2000) 139–143.

* cited by examiner

*Primary Examiner*—Wayne A. Langel
(74) *Attorney, Agent, or Firm*—Birch Stewart Kolasch & Birch LLP

(57) ABSTRACT

This invention is directed to a method of reversibly storing hydrogen comprising exposing a solid sorbent of metal-doped carbon-based material to a hydrogen atmosphere at a temperature of from about 250 K to about 973 K under ambient or higher pressure. The metal-doped carbon-based material is generally an alkali metal-doped carbon-based material prepared by mixing a carbon material with an alkali metal salt and calcining the mixture under an atmosphere of inert or reductive gas.

35 Claims, 2 Drawing Sheets

"nanotube"

Stacked
Truncated Nanocones

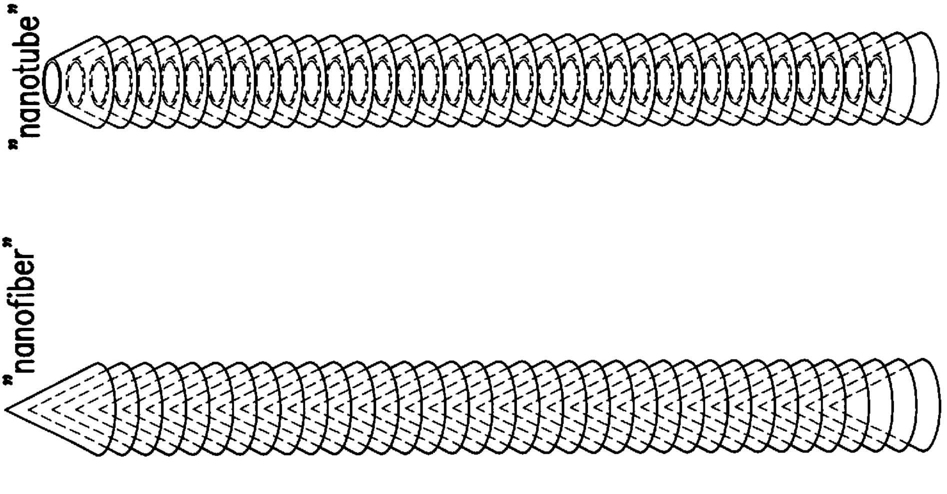
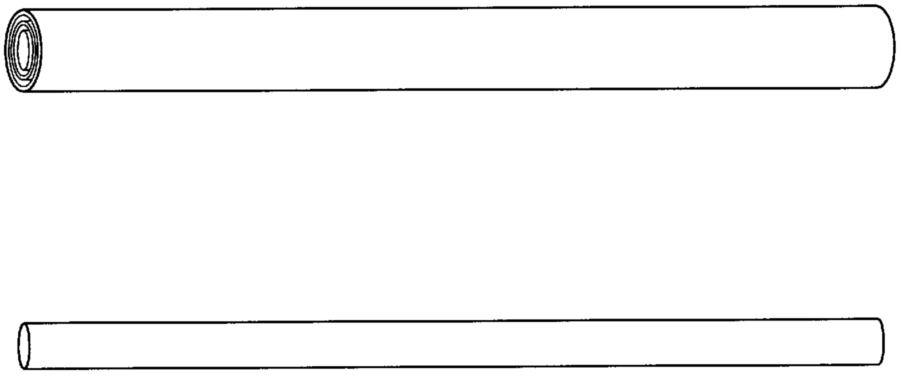
Generic Name
Specific Name

METHOD OF REVERSIBLY STORING $H_2$ AND $H_2$ STORAGE SYSTEM BASED ON METAL-DOPER CARBON-BASED MATERIALS

BACKGROUND OF THE INVENTION

1. Field of the Invention

This invention relates to a method of storing $H_2$ in metal-doped carbon-based solid state sorbents, such as carbon nanotubes (including stacked truncated carbon nanocones), carbon nanofibers, activated carbon, carbon fibers, graphite and amorphous carbon. The present invention also relates to metal-doped carbon-based sorbent materials capable of absorbing up to 25 wt % of hydrogen at moderate temperature and pressure.

2. Description of Related Art

Hydrogen has been recognized as an ideal energy carrier. However, end-user hydrogen storage is still one of the challenging technical problems attracting increasing research interest[1-5] to make it truly useful. In fact, a substantial number of research groups worldwide have put intensive effort to try to use a hydrogen based fuel cell as a power source for automobiles and other devices. These groups have encountered problems associated with high cost and low efficiency of the hydrogen storage systems.

Currently, there are four kinds of $H_2$ storage systems in use: (a) liquid hydrogen, (b) compressed gas, (c) cryo-adsorption and (d) metal hydride storage systems. A brief description of these existing methods is given below:

(a) The liquid hydrogen storage system is of importance because it offers good solutions in terms of technology and economy, both for mobile storage systems and large-volume storage for volumes of from 100 liters to 5000 $m^3$. However, in order to store the liquefied hydrogen, the container (dewar) should be made of super-insulating materials, which is very expensive in practice.

(b) The compressed gas storage system is usually applied in underground supply systems, similar to a network of natural gas. This is an economical and simple method, but it is unsafe and not portable.

(c) Cryo-adsorbing storage systems show advantages in moderate weight and volume. In this system, hydrogen molecules are bound to the sorbent only by physical adsorption forces, and remain in the gaseous state. The adsorbing temperature is in the range of 60 to 100 K. Normally, activated carbon is used as the sorbent due to its large portion of small pores serving as arenas for storing $H_2$. The efficiency of $H_2$ uptake is no more than 7 wt %, which is equivalent to about 20 kg $H_2$ per cubic meter of activated carbon. The disadvantages of this system relate to the low capacity and the much lower temperature required, which, similar to that of liquid hydrogen systems, makes it necessary to use suitable super-insulated containers, and thus the cost is increased.

(d) Metal hydride storage systems are recognized as a novel concept in hydrogen storage. These store large quantities of $H_2$ via a chemical reaction of H+M=M—H, wherein M is a selected metal system. Two major metal systems, i. e. Fe—Ti and Mg—Ni, have been applied as $H_2$ storage media and have been put into use in automobiles driven by an $H_2/O_2$ fuel cell. The operating temperature is 40–70° C. for the Ti—Fe system and 250–350° C. for the Mg—Ni system. The $H_2$ storage capacity is less than 5 wt % for Ni—Mg and 2 wt % for Fe—Ti, which corresponds to less than 70 kg $H_2$ per cubic meter of metals. Furthermore, metal hydride systems normally require 20–40 bar pressure to keep the hydrogen in equilibrium. This renders the container for the metal hydride too heavy and expensive, and limits the practical exploitation of these systems.

The last two mentioned $H_2$ storage systems above are chosen only in some special applications due to their relatively low $H_2$ storage capacity and high cost. Embodiments of the present invention advantageously provide systems which increase $H_2$ storage capacity relative to prior systems and also provide for hydrogen storage under practical conditions.

Alkali-metal based materials have been reported as being able to absorb $H_2$. For Li-based materials, normally in the case of an Li battery, hydrogen absorption takes place under electro-chemical conditions[1]. LiH can be formed at 300–500° C., but the dissociation requires 700–900° C. For K-based materials, it has been reported that about 160 ml of hydrogen was absorbed by 1 gram K-intercalated graphite at liquid nitrogen temperature[6]. The intercalation of alkali metal into graphene layers may form a compound, $C_nM$.

More recently, several articles have been published[7-8] concerning storing $H_2$ on carbon materials . A. C Dillon et al. reported that about 0.01 wt % of $H_2$ was absorbed by raw carbon nanotube material (which was estimated to constitute 5 wt % of the single wall nanotube material) at 130 K, and A. Chambers et al. reported 65 wt % of hydrogen uptake was achieved by using herringbone-like graphite nanofibers under 200 atm pressure.

BRIEF SUMMARY OF THE INVENTION

The present invention advantageously provides a method which increases the hydrogen storage capacity of a solid sorbent. Advantageously, the present invention also provides a method which enables the storage of hydrogen to be reversibly performed under ambient or higher pressure and moderate temperature. Still further, the present invention advantageously provides a means to economically make an efficient sorbent.

The above advantages may be achieved by modifying the nature of a carbon-based material which is to be used as the sorbent in a hydrogen storage system. The modification according to the invention comprises the doping of the carbon-based material with a metal which doping causes a distinct change in the structural and electronic properties of the carbon-based material.

The terms “doping” and “doped”, in the context of the description of the present invention, refers to the addition of metal to carbon materials with the result that the structural and electronic properties of the carbon material are changed. This contrasts with a more strict definition of doping where actual replacement of carbon atoms within the graphitic structure is assumed. Without being bound by any theory of the invention, the inventors believe that a carbon metal compound structure is formed.

According to one aspect of the invention, there is provided a method of reversibly storing hydrogen comprising exposing a solid sorbent of metal-doped carbon-based material to a hydrogen atmosphere at a temperature of from about 250 K to about 973 K under ambient or higher $H_2$ pressure, preferably from about 1 to about 200 atm, more preferably from about 1 to about 100 atm and most preferably from about 1 to about 5 atm.

According to another aspect of the invention, there is provided a method of reversibly storing hydrogen comprising pre-treatment of a solid sorbent comprising a metal-doped carbon-based material in an inert atmosphere at high temperature before exposing a solid sorbent of metal-doped carbon-based material to a hydrogen atmosphere at a lower temperature under ambient or higher $H_2$ pressure.

According to another aspect of the invention, there is provided a method of preparing an alkali metal-doped carbon-based material for use in reversibly storing hydrogen comprising mixing a carbon material with an alkali metal salt and calcining the mixture under an atmosphere of inert or reductive gases.

There is also provided a hydrogen storage system comprising an alkali metal-doped carbon-based material prepared in accordance with the method described in the immediately preceding paragraph.

Additional information concerning this invention is contained in P. Chen et al., Science 285 91 (1999), the entire contents of which are hereby incorporated by reference.

Additional features and advantages of the invention will be set forth in the description which follows, and in part will be apparent from the description, or may be learned by practice of the invention. These variations are considered to be in the scope of the invention. The objectives and other advantages of the invention will be realized and attained by the structure particularly pointed out in the written description and claims hereof as well as the appended drawings.

BRIEF DESCRIPTION OF THE DRAWINGS

FIGS. 1*a*–1*d* are schematic representations of various generic nanotube (FIGS. 1*a*, 1*b* and 1*d*) and nanofiber (FIG. 1*c*) structures. In (a) a single walled nanotube, in (b) a multi-walled nanotube, in (c) stacked nanocones and in (d) stacked truncated nanocones are illustrated.

DETAILED DESCRIPTION OF THE INVENTION

Figures 2A, 2B, 2C, 2D:
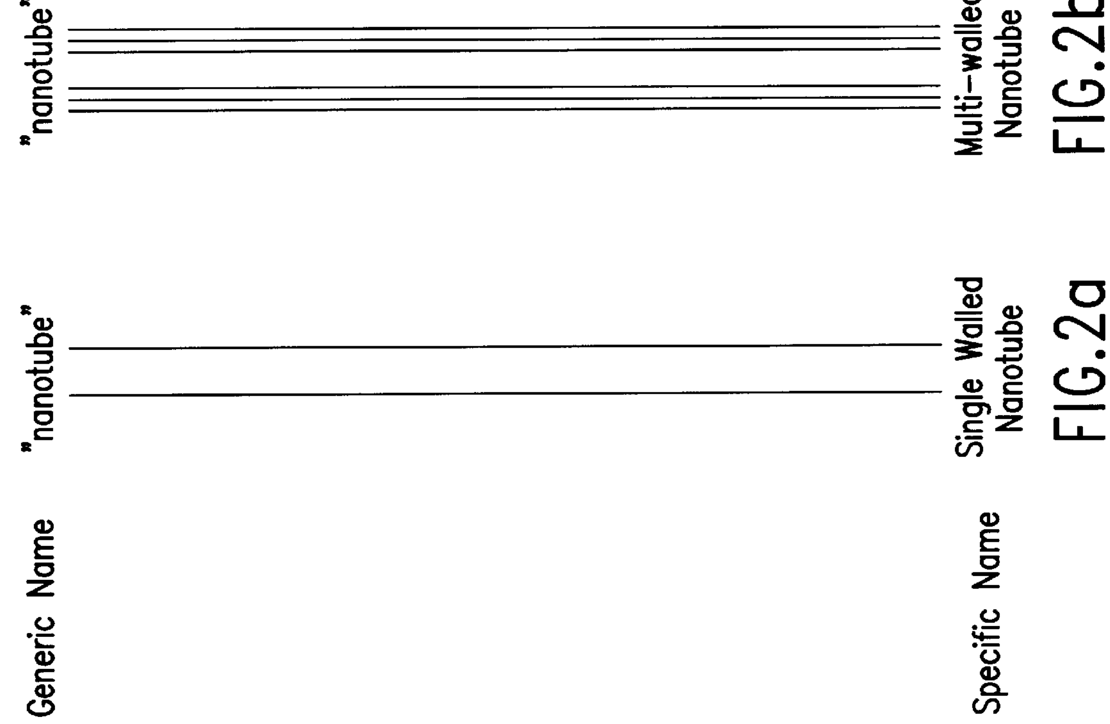
FIGS. 2*a*–2*d* are schematic representations of the cross-sections of the nanotube (FIGS. 2*a*, 2*b* and 2*d*) and nanofiber (FIG. 2*c*) structures illustrated in FIGS. 1*a*–1*d*. In (a) a single walled nanotube, in (b) a multi-walled nanotube, in (c) stacked nanocones and in (d) stacked truncated nanocones are illustrated.

The alkali-doped carbon based materials are sensitive to oxygen or moisture. Exposure to oxygen during or after the calcination process greatly reduced the ability of the sorbent material to take up hydrogen. It is therefore preferred to use salt lacking oxygen in the calcination process. If the ability of hydrogen uptake of the alkali-doped carbon-based material is impaired by exposure to oxygen or moisture, this impairment can be reversed by a pre-treatment at an elevated temperature for a period of time before charging the doped material with hydrogen.

Preferably the carbon material of the carbon-based material is selected from carbon nanotubes (including but not limited to stacked truncated carbon nanocones), activated carbon, carbon powder, amorphous or disordered carbon, carbon fibers, carbon nanofibers and graphite, and the metal is an alkali metal.

Graphite is commercially available and has a layered structure, high crystallinity and low surface area. The typical graphite interplanar distance is 0.335 nm.

Carbon fibers are commercially available and made of carbon with a graphite-like structure. One way of making carbon fibers commercially is by catalytic decomposition of hydrocarbons. The diameter of carbon fibers is on the order of microns up to centimeters.

Carbon nanofibers (or graphite nanofibers) are similar to carbon fibers in that they are made of carbon with a graphite-like structure[8]. However, the diameter is much smaller in that it is on the order of nanometers. The smaller diameter may be related to the manufacturing process such as using a smaller sized catalyst[9]. Carbon fibers and carbon nanofibers have slender solid structure. One special type of carbon nanofiber structure is the so-called herringbone structure consisting of stacked nanocones (FIGS. 1*c* and 2*c*). Carbon nanocones may be visualized as graphene sheets rolled into conical shells. When the conical shells are stacked up (FIG. 1*c*) they form nanofibers with so-called herringbone structures as shown in (FIG. 2C). When the conical shells are truncated and are stacked up they form nanotubes as shown in (FIG. 1*d*) with a schematic cross-sectional representation as in (FIG. 2*d*).

Active carbon is commercially available. The activity of activated carbon is related to its large surface area, porosity and low crystallinity.

Amorphous carbon is commercially available carbon with low crystallinity.

There are two types of carbon nanotubes referred to in this invention. The first type of carbon nanotubes has walls parallel to the longitudinal axis of the tubular structure. The walls have similar structure as that of graphite, but with graphene sheets arranged as nested concentric cylinders. These carbon nanotubes can be either single-wall (FIGS. 1*a* and 2*a*) or multi-wall (FIGS. 1*b* and 2*b*) depending on whether a single or multiple graphene sheets are arranged as nested concentric cylinders around each other. These carbon nanotubes can be made from catalytic disproportionation of CO, as previously reported[10] or by other methods well known in the art. The outer diameter of these single- or multi-wall carbon nanotubes ranges from 1 to 35 nm with an average of 15 nm.

The second type of carbon nanotubes, the stacked truncated carbon nanocones, are made from $CH_4$ decomposition over the Ni-, Co- or Fe-based catalyst as previously reported[10]. The structure of stacked truncated carbon nanocones shows certain differences when compared with carbon nanotubes and graphite. For example, the truncated conical shells may be visualized as graphene sheets arranged into the shape of a frustrum with open ends (FIG. 1*d*). The truncated conical shells pile up or stack up to form a hollow tubular shape with lengths varying from several microns up to several hundred microns. The outer diameter varies from 10 to 60 nm (average 30 nm) and the inner diameter varies from 0.1 to 10 nm depending on the conditions during catalytic decomposition of $CH_4$.

Preferably carbon nanotubes or nanofibers are used which have been prepared by catalytic disproportionation of CO (first type nanotube) or decomposition of $CH_4$ (second type nanotube) on a Ni-based catalyst. After purification, more than 75%, typically more than 85% and, more typically, 90% or more of the product is advantageously in the form of nanotubes. The structural properties of carbon nanotubes and nanofibers are similar to that of graphite, but with greater interlayer distance: 0.345 nm for both types of nanotubes, compared with 0.335 nm for graphite. Both nanotubes and nanofibers can reach several microns in length.

Most preferably, the nanotubes have a stacked truncated nanocone structure as illustrated in FIG. 1*d*, a cross-sectional view of which appears in FIG. 2*d*.

Preferably, the metal-doped carbon-based material is an alkali metal-doped carbon-based material. The alkali metal may be, for example, Li, Na, K, Rb or Cs. Mixtures of alkali metals can be used. For example, two or three different metals can be used, preferably a mixture of Li and one additional alkali metal. An exemplary mixture is of Li and K.

In certain embodiments, the temperature for hydrogen absorption is in the range of 400–900 K for Li-doped carbon materials, preferably between 500 and 670 K, and 200–700 K for Na- or K-doped carbon materials, preferably between 300 and 470 K. The pressure for the absorption process is preferably as high as practical. The higher charging pressure results in saturation in a shorter time. Typically, the charging pressure is between 1 and 100 atm, more typically between 1 and 30 atm, most typically between 1 and 5 atm.

The doping of alkali metals to the carbon materials may be achieved by solid state reaction between the carbon materials and alkali metal salts. The solid state reaction method preferably involves thoroughly mixing the carbon materials with the alkali metal salt, then subjecting the mixture to high temperature treatment under inert gases, such as He, $N_2$, Ar, etc. or reductive gases such as $H_2$. etc.

The alkali-doped carbon based materials are sensitive to oxygen or moisture. Exposure to oxygen during or after the calcination process greatly reduces the ability of the sorbent material to take up hydrogen. It is therefore preferred to use a salt lacking in oxygen in the calcination process. If the ability of hydrogen uptake of the alkali-doped carbon-based material is impaired by exposure to oxygen or moisture, this impairment can be reversed by a pre-treatment at an elevated temperature under an inert atmosphere (e.g. Ar, $N_2$) or a reducing atmosphere (e.g. $H_2$) for a period of time before charging the doped material with hydrogen.

In certain embodiments, a pre-treatment at elevated temperature is performed on the doped material at temperatures ranging between 373 and 1073 K under an inert atmosphere such as Ar or $N_2$ before charging the doped material with $H_2$ at a lower temperature. For the K-doped material, the subrange between 573 and 973 K is typically chosen. For the Li-doped material, the subrange between 673 and 1023 K is typically chosen.

The alkali metal salts may include carbonates, nitrates, hydroxides, halogenides, acetates, hydrides, nitrites, or the like. The molar ratio of alkali metal to the carbon materials in the reaction is preferably from about 1:50 to 1:1, more preferably from 1:10 to 1:1 for Li and 1:20 to 1:5 for K or Na.

More particularly, the temperature for the chemical reaction is preferably in the range of from 473 to 1273 K according to the alkali metal salts selected. Typical conditions are 473–1073 K, more typically 773 to 1073 K for doping with Li under hydrogen or an inert gas, and 573–1273 K, more typically 623 to 973 K for doping with Na and K under hydrogen.

The abnormal capability for reversible $H_2$ sorption by the alkali metal-doped carbon materials according to embodiments of the invention is derived from the doping of alkali metal into the carbon materials. The electronic structure of the carbon material is changed significantly due to the alkali metal doping, as revealed by our XPS and UPS studies. Alkali metal in the alkali metal-doped carbon-based materials transfers a near unity charge to carbon, resulting in an M+ state and a significant increase in free electron density in the graphene layers. In the valence band region the alkali metal doping creates an extra density of states at the Fermi edge. This alkali metal-derived Fermi-level band shifts the Fermi level closer toward the instrument vacuum level and plays a particularly important role in reducing the activation energy for the dissociative hydrogen chemisorption. However, other mechanisms of reversible hydrogen sorption, such as physical adsorption, are possible.

The hydrogen dissociative absorption on carbon is a slow activated process, with an activation energy corresponding to an above-zero-energy crossing between the dissociated H-atoms and $H_2$ molecular potential curves. Few molecules may have high enough energy to surmount this intrinsic energy barrier, resulting in minimal sticking taking place on carbon at ambient pressure and moderate temperatures without metal-doping. Energetically the key step for this process is the weakening and the final breaking of the H—H bond. Band-structure calculations indicate that the half-filled Fermi level band created by the alkali metal doping is formed by the hybridization of the alkali metal outermost s orbital with a low-lying bonding C $\pi$ band. It has primarily a C $\pi$ character, and is spatially confined near the C planes. This carbon metal band can overlap strongly with the hydrogen $(1s^2)^*$ orbital, resulting in the lowering and filling of this antibonding orbital, and hence the reduction of the activation energy for the hydrogen dissociative absorption. This results in enhanced hydrogen uptake on the alkali metal-doped carbon materials.

The following specific examples are provided to illustrate the invention. It will be understood, however, that the specific details given in each example have been selected for purpose of illustration and are not to be construed as a limitation on the invention. Generally, the experiments were conducted under similar conditions for carbon sorbents doped with the same alkali metal, except for the selection of carbon materials and $H_2$ pressure.

EXAMPLE 1

600 mg of stacked truncated carbon nanocones with average diameter of 30 nm were thoroughly mixed with 30 mol % LiI. The mixture was heated in a flow of purified helium at ambient pressure to 700° C. and maintained for 1 h, and then cooled to room temperature to form Li-doped stacked truncated carbon nanocones. 30 mg of Li-doped stacked truncated carbon nanocones were put into the sample holder of a thermogravimetric analyzer (TGA), and $H_2$ was introduced as the purging and holding gas. After maintaining the sample at room temperature for 60 min and purging with $H_2$, maintaining an $H_2$ atmosphere at 30 psi to drive away the air left in the sample chamber, the temperature was increased from room temperature to 973 K at a rate of 20 K/min, and maintained at 973 K for 1 h to outgas the absorbed water and volatile contaminants. Then, the sample was cooled to 623 K at a rate of 20 K/min, and maintained for 2 h.

EXAMPLE 2

600 mg of carbon nanotubes were mixed with 20 mol % $LiNO_3$. The mixture was heated to 800° C. and maintained for half an hour, and then cooled to room temperature to form Li-doped carbon nanotubes. 20 mg of the prepared Li-doped carbon nanotubes were put into the sample holder of the TGA, following the same procedures as example 1.

EXAMPLE 3

Graphite was used as the starting material, following the same procedures of example 1.

EXAMPLE 4

600 mg of activated carbon was mixed with 30 mol % of KOH. The mixture was calcined at 800° C. for half an hour in a flow of purified hydrogen, and then cooled to room temperature to form K-doped activated carbon. 50 mg of K-doped activated carbon was put in the sample container of the TGA, and purified $H_2$ was introduced to the TGA system as the purge gas. The system was heated to 873 K to remove absorbed water and volatile contaminants, and then cooled to 298 K and maintained for 2 h.

EXAMPLE 5

The stacked truncated carbon nanocones were used as the starting material, following the same procedures of example 4.

EXAMPLE 6

600 mg of activated carbon was mixed with 2 molar % of KOH. The mixture was calcined at 400° C. for an hour in a flow of purified hydrogen, and then cooled down to room temperature to form K-doped activated carbon. 50 mg of K-doped activated carbon was put in the sample container of the TGA, and purified $H_2$ was introduced as the purge gas to the TGA system. The system was heated to 673 K to remove absorbed water and volatile contaminants, and then cooled down to 298 K and maintained for 2 h.

EXAMPLE 7

NaOH and activated carbon were used as the starting material, following the same procedures of example 4.

EXAMPLE 8

Li-doped stacked truncated carbon nanocones were used as the sorbent and were exposed to purified $H_2$ at 200 psi for 1 hour. This is shorter than the 2 h required for the similar test in example 1.

EXAMPLE 9

Li-doped carbon nanotubes (multi-wall, first type nanotubes) were used as the sorbent, following the same procedures of example 1.

EXAMPLE 10

100 mg of Ni catalyst was pre-reduced at 700° C. in a flow of purified hydrogen in a tubular reactor for 1 hour. The hydrogen gas was then replaced by purified $CH_4$ as the feed-gas and the reaction system was maintained at 700° C. for 1 hour to let $CH_4$ decompose on the Ni catalyst. The $CH_4$ gas supply was then turned off and the catalyst together with the material formed was allowed to cool down to room temperature under ambient pressure. The material collected comprises truncated stacked carbon nanocones with metal catalyst attached, formed by decomposition of $CH_4$ on the Ni catalyst.

The material collected is then washed in dilute nitric acid and rinsed with distilled water to remove the attached metal catalyst. 600 mg of the stacked truncated nanocones thus derived was thoroughly mixed with 50 molar % LiI, following the same procedure as in Example 1.

The $H_2$-rechargeability of Li- and K-doped samples was tested by TGA. For Li-doped samples (carbon nanotubes and graphite), the saturated $H_2$ uptake was measured at 653 K after each complete desorption at 823 K, whereas for K-doped carbon materials it was measured at 298 K after each run of desorption at 773 K.

To those skilled in the art, it is to be understood that many changes, modifications and variations could be made without departing from the spirit and scope of the present invention. The disclosures and the descriptions herein are purely illustrative and are not intended to limit the scope of the invention, which is defined and by the claims.

REFERENCES

1. G. C. Carter and F. L Carter. *Metal-Hydrogen Systems*. T. Nejat Veziroglu, Eds. (Pergamon, Oxford, 1981). chap. 7.
2. H. Buchner, P. Pelloux-Gervais, M. Müller, F. Grafwallner and P. Luger. *Hydrogen and other alternative fuels for air and ground transportation*. H. W. Pohl, Eds. (John Wiley & Sons, Chichester 1995). chaps. 7–11.
3. J. Nitsch, W. Peschka, W. Schnurnberger, M. Fischer and H. Eichert. *Hydrogen as an energy carrier*. C. Winter and J. Nitsch, Eds. (Springer-Verlag, Berlin, 1988). part B.
4. S. Hynek, W. Füller and J. Bentley. *Int. J. Hydrogen Energy*, 22, 601 (1997).
5. J. S. Noh, R. K. Agarwal and J. A. Schwarz, *Int. J. Hydrogen Energy*, 12, 693 (1987).
6. K. Watanabe, M. Soma, T. Onishi and K. Tamaru. *Nature*, 233, 160 (1971).
7. A. C. Dillon, K. M. Jones, T. A. Bekkedahl, C. H. Kiang, D. S. Bethuune and M. J. Heben. *Nature*, 386, 377 (1997).
8. A. Chambers, C. Park and R. T. K. Baker. *J. Phys. Chem. B*, 102, 4253 (1998).
9. N. M. Rodriguesz, *J. Mater. Res.*, 8 (12) 3233 (1993)
10. P. Chen et al. *Carbon* 35 (Bi, 10–11) 1495 (1997)
11. V. A. Nalimova et al. *Synthetic Metals*, 88 89 (1997)

What is claimed is:

1. A method of reversibly storing hydrogen comprising exposing a solid sorbent comprising an alkali metal-doped carbon-based material that is doped with at least one alkali metal to a hydrogen atmosphere at a temperature of from about 200 K to about 973 K under 1 atm or higher $H_2$ pressure.

2. The method of claim 1, wherein the at least one alkali metal is selected from the group consisting of Li, Na, K, Rb and Cs.

3. The method of claim 1, wherein the alkali metal is Li and the solid sorbent is exposed to said hydrogen atmosphere at a temperature of from 400 to 900 K.

4. The method of claim 1, wherein the alkali metal is Na or K and the solid sorbent is exposed to the hydrogen atmosphere at a temperature of from 200 to 700 K.

5. The method of claim 1, wherein the alkali metal-doped carbon-based material is doped with a mixture of more than one alkali metal.

6. The method of claim 5, wherein the mixture of more than one alkali metal comprises Li and at least one other alkali metal.

7. The method of claim 6, wherein the mixture of more than one alkali metal comprises Li and K.

8. The method of claim 1, wherein the alkali metal-doped carbon-based material is prepared by a solid state reaction between at least one carbon material and at least one alkali metal salt wherein the solid state reaction comprises mixing the at least one alkali metal salt and the at least one carbon material, and calcining the mixture under an atmosphere of inert or reductive gas.

9. The method of claim 8, wherein the alkali metal salt is one or more selected from the group consisting of nitrates, hydroxides, carbonates, halogenides, acetates, hydrides and nitrites.

10. The method of claim 8, wherein the carbon material consists of graphite and the alkali metal salt consists of Li-halogenide.

11. The method of claim 8, wherein the carbon material consist of activated carbon and the alkali metal salt is either K- or Na-hydroxide.

12. The method of claim 8, wherein the alkali metal salt is mixed with the carbon based material in a molar ratio of alkali metal to the carbon material from 1:50 to 1:1 in the reaction.

13. The method of claim 12, wherein the molar ratio of alkali metal to carbon is 1:2 in the reaction.

14. The method of claim 13, wherein the alkali metal is Li.

15. The method of claim 8, wherein the alkali metal salt is an Li salt and the chemical reaction is carried out at a temperature of from 573 to 1073 K under a hydrogen or inert gas atmosphere or wherein the alkali metal salt is a Na or K salt and the chemical reaction is carried out at a temperature of from 573 to 1273 K under a hydrogen atmosphere.

16. The method of claim 1, wherein the solid sorbent is exposed to the hydrogen atmosphere at a pressure of from 1 to 200 atm.

17. The method of claim 1, wherein said alkali metal-doped carbon-based material comprises at least one carbon material selected from the group consisting of carbon fibers, carbon nanofibers, activated carbon, carbon nanotubes, graphite and amorphous carbon.

18. The method of claim 17, wherein the carbon material consists of stacked truncated nanocone type nanotubes.

19. The method of claim 17, wherein the carbon material comprises either carbon nanotubes with single or multiple walls having an average outer diameter of 1 to 35 nm or stacked truncated nanocones having an average outer diameter of 10 to 60 nm.

20. A method of reversibly storing hydrogen comprising:

pre-treating a solid sorbent comprising a carbon-based material that is doped with at least one alkali metal, in an inert atmosphere; and exposing the pre-treated solid sorbent to a hydrogen atmosphere at a temperature of from 200 K to 973 K under ambient or higher $H_2$ pressure.

21. The method of claim 20, wherein the pre-treating step is carried out at between 373 and 1073 K.

22. A hydrogen storage system comprising the alkali metal doped carbon-based material prepared in accordance with the method of claim 20.

23. The system of claim 22 wherein there is rechargeability of at least 90% after 20 cycles of absoprtion-desorption.

24. The method of claim 20, wherein the alkali metal is Li and the solid sorbent is exposed to the hydrogen atmosphere at a temperature of from 400 to 900 K.

25. The method of claim 20, wherein the alkali metal is Na or K and the solid sorbent is exposed to the hydrogen atmosphere at a temperature of from 200 to 700 K.

26. The method of claim 20, wherein the carbon-based material that is doped with at least one alkali metal is prepared by a solid state chemical reaction between the carbon material and at least one a alkali metal salt and wherein the chemical reaction comprises mixing at least one alkali metal salt and the carbon material, and calcining the mixture under an atmosphere of inert or reductive gas.

27. The method of claim 26, wherein the alkali metal salt is one or more selected from the group consisting of nitrates, hydroxides, carbonates, halogenides, acetates, hydrides, and nitrites and wherein the molar ratio of alkali metal to carbon in said alkali metal-doped carbon-based material is from 1:50 to 1:1 in the reaction.

28. The method of claim 26, wherein the carbon material consists of graphite and the alkali metal salt consists of Li-halogenide.

29. The method of claim 26, wherein the carbon material consist of activated carbon and the alkali metal salt is either K- or Na-hydroxide.

30. The method of claim 26, wherein the alkali metal salt is a Li salt and the chemical reaction is carried out at a temperature of from 573 to 1073 K under a hydrogen or inert gas atmosphere or wherein the alkali metal salt is a Na or K salt and the chemical reaction is carried out at a temperature of from 573 to 1273 K under a hydrogen atmosphere.

31. The method of claim 20, wherein the solid sorbent is exposed to the hydrogen atmosphere at a pressure of from 1 to 200 atm.

32. The method of claim 20, wherein the metal-doped carbon-based material comprises at least one carbon material selected from the group consisting of carbon fibers, carbon nanofibers, activated carbon, carbon nanotubes, graphite and amorphous carbon.

33. The method of claim 32, wherein the carbon material comprises either carbon nanotubes with single or multiple walls having an average outer diameter of 1 to 35 nm or stacked truncated carbon nanocones having an average outer diameter of 10 to 60 nm.

34. A material prepared by pre-treating a solid sorbent comprising a carbon-based material that is doped with a t least one alkali metal, in an inert atmosphere, and exposing the pre-treated solid sorbent to a hydrogen atmosphere at a temperature of from 200 K to 973 K under ambient or higher $H_2$ pressure.

35. The material of claim 34, wherein the solid sorbent comprises alkali metal doped stacked truncated nanocones.

* * * * *

UNITED STATES PATENT AND TRADEMARK OFFICE

CERTIFICATE OF CORRECTION

PATENT NO. : 6,471,936 B1
DATED : October 29, 2002
INVENTOR(S) : Ping Chen et al.

It is certified that error appears in the above-identified patent and that said Letters Patent is hereby corrected as shown below:

Title page, Item [54] and Column 1, lines 1-4,
Please correct the title of the invention from "METHOD OF REVERSIBLY STORING $H_2$ AND $H_2$ STORAGE SYSTEM BASED ON METAL-DOPER CARBON-BASED MATERIALS" to -- METHOD OF REVERSIBLY STORING $H_2$ AND $H_2$ STORAGE SYSTEM BASED ON METAL-DOPED CARBON-BASED MATERIALS --

Title page,
Item [75], Inventors, please correct the name of the first inventor from "Pin Chen" to -- Ping Chen --

Signed and Sealed this

Twenty-second Day of July, 2003

JAMES E. ROGAN
*Director of the United States Patent and Trademark Office*